(12) United States Patent
Stoops

(10) Patent No.: US 9,104,050 B2
(45) Date of Patent: Aug. 11, 2015

(54) PROTECTIVE COVERING FOR LCD

(76) Inventor: Kevin R. Stoops, Bucyrus, KS (US)

( * ) Notice: Subject to any disclaimer, the term of this patent is extended or adjusted under 35 U.S.C. 154(b) by 0 days.

(21) Appl. No.: 13/231,543

(22) Filed: Sep. 13, 2011

(65) Prior Publication Data

US 2011/0317088 A1    Dec. 29, 2011

Related U.S. Application Data

(63) Continuation of application No. 11/672,899, filed on Feb. 8, 2007, now Pat. No. 8,018,547.

(60) Provisional application No. 60/771,490, filed on Feb. 8, 2006.

(51) Int. Cl.
*G02F 1/1333* (2006.01)

(52) U.S. Cl.
CPC ...... *G02F 1/133308* (2013.01); *G02F 2201/50* (2013.01)

(58) Field of Classification Search
USPC .................................................. 349/58, 60
See application file for complete search history.

(56) References Cited

U.S. PATENT DOCUMENTS

2004/0066613 A1 *   4/2004   Leitao ........................ 361/683

FOREIGN PATENT DOCUMENTS

JP           20218279        *  8/1998
WO        WO 97/48035     *  12/1997

OTHER PUBLICATIONS

H. Hansmann, "ASM Handbook / extraction Polyester Resins", FB MVU, Werkstofftechnologien / Kunststofftechnik Oct. 2003.*
Bockstahler et al.; "Thermal Properties of Polyester Resins", Industrial and Engineering Chem Istry, Aug. 1954, pp. 1639-1643.*

* cited by examiner

*Primary Examiner* — Hoan C Nguyen
(74) *Attorney, Agent, or Firm* — Kutak Rock LLP; Bryan P. Stanley

(57) ABSTRACT

A protective covering for a LCD display is provided. The protective covering includes a sheet-like front portion, which rests over the surface of the LCD display when in use, a top portion that extends backwards from the sheet-like front portion, a back portion that extends downward from the top portion, and a pair of tabs that extend inward from the back portion such that the protective covering can be secured in place over the LCD monitor.

21 Claims, 5 Drawing Sheets

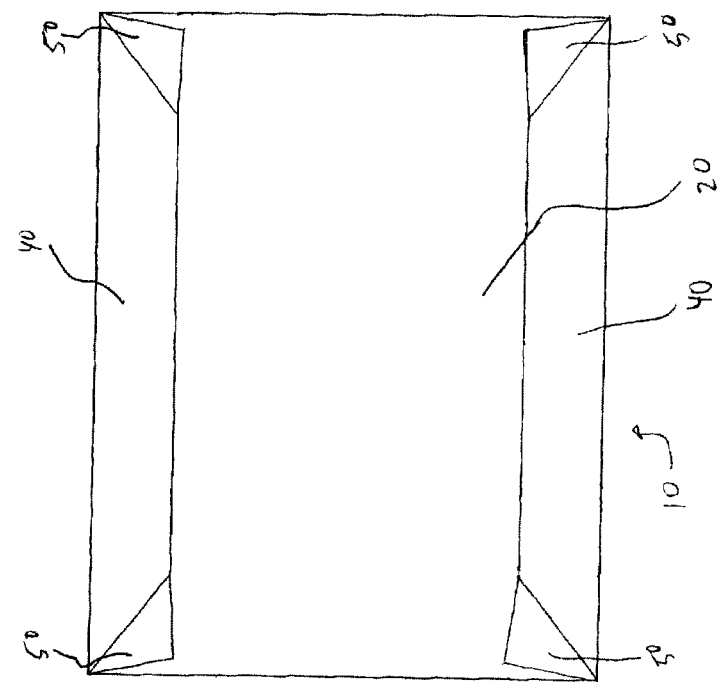
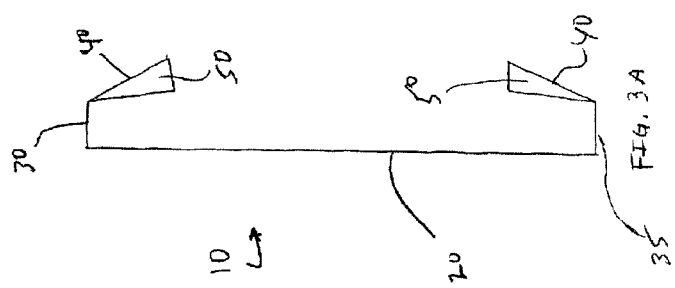

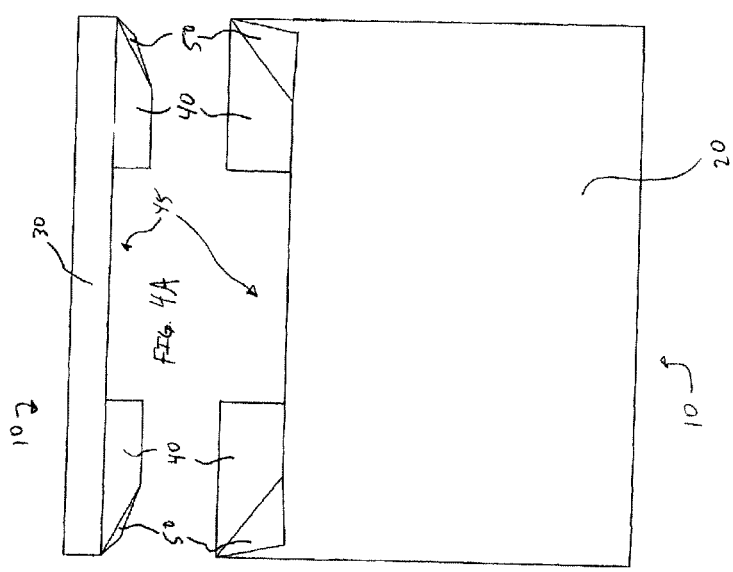

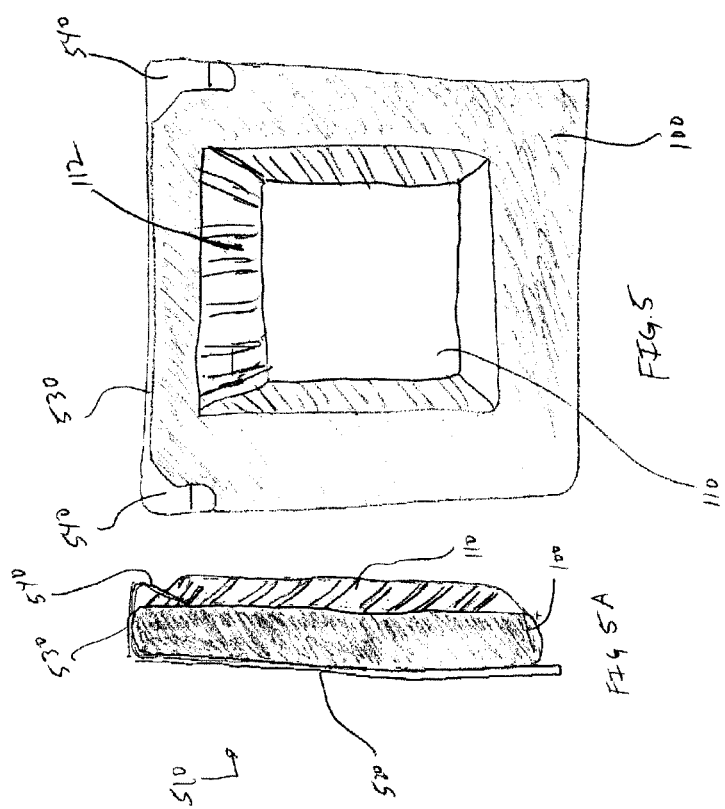

PROTECTIVE COVERING FOR LCD

This application is a continuation of U.S. application Ser. No. 11/672,899, now U.S. Pat. No. 8,018,547, which claims priority pursuant to 35 U.S.C. 119(e) to co-pending U.S. Provisional Patent Application Ser. No. 60/771,490, filed Feb. 8, 2006, the entire disclosures of which are incorporated herein by reference.

FIELD OF THE INVENTION

The present invention relates generally to a protective covering for LCD screens.

BACKGROUND OF THE INVENTION

Liquid Crystal Displays (LCDs) are rapidly displacing cathode ray tubes (CRTs) across a variety of industries. The benefits of LCDs, and the drop in cost over time, have facilitated this transition. LCDs, for example, use anywhere from ⅓ to 60% less energy than a typical CRT. Further, LCDs do not emit the Very Low Frequency and Extra Low Frequency electromagnetic radiation emitted by CRTs. It is thought that these electromagnetic emissions may be harmful to one's health, making LCDs an attractive alternative for those who spend a great deal of time using a display of one type or another.

In addition to the above, CRTs generally include mercury, lead, and glass in relatively high amounts, all of which can lead to environmental concerns when a CRT is no longer in use and must be disposed of. LCDs do not typically have the same environmental problems related to disposal as do CRTs. Finally, LCDs have better contrast than CRTs, making them well-visible in lower levels of ambient lighting than a typical CRT. Thus, use of an LCD can provide energy savings in terms of ambient lighting as well as the energy usage of the device itself. Further, the better contrast leads to fewer fatigue problems among users, particularly when levels of ambient light are lower.

Despite the advantages of the LCD over the CRT, there are still problems associated with the use of LCDs in various industries, and even in the home. A primary problem associated with the use of LCDs is the thin glass that protects the LCD. The glass or plastic surface of an LCD could be as little as 1 millimeter thick. This thinness is not only desirable from a marketing standpoint, but is actually required due to the nature of the device. Because light emitted from an LCD travels through a variety of media, the viewing angle of an LCD is narrowed as compared to that of a CRT. This can result in the inability to properly see images, or to experience color-shifts when viewing the screen from other than substantially in front of the display. The thickness of the glass surface of the LCD can directly impact the viewing angle of the device, and therefore thin glass must be used to preserve the desired viewing angle.

The thin glass of an LCD is, of course, susceptible to being damaged by both sharp and blunt objects, industrial or other cleaners, and the like. In the restaurant industry, for example, LCD monitors are often used to indicate to a kitchen what items must be prepared in order to fulfill an order. The personnel working in the kitchen are generally using knives, forks, and other implements, and often use such items to point at the display in order to convey information to other workers. With the CRTs of the past, this behavior was not problematic due to the thickness of the glass used in the CRT. With LCDs, however, knives and other objects are routinely inadvertently used to pierce or otherwise damage the glass surface of the LCD. This leads to a substantial cost to a business of replacing LCD monitors. Likewise, small children in a home may inadvertently damage the LCD, or accidents either in the home or the workplace may damage such a display. Also, when an LCD becomes dirty, as happens frequently in, for example, restaurant and industrial uses, the screen is easily damaged during cleaning due to the harsh nature of some cleaners or the lack of skill of the person doing the cleaning.

Therefore, it would be beneficial to provide a lightweight, inexpensive, readily-cleanable protective covering for LCD displays.

SUMMARY OF THE INVENTION

An object of the instant invention is to provide a protective covering for a LCD display screen. Another object of the present invention is to provide a protective covering for a LCD display that is lightweight, inexpensive, and readily-cleanable.

The present invention is directed to a protective covering for a LCD. It is preferred that the covering is produced from a sheet of polycarbonate (such as Lexan), but it is contemplated that any suitable material may be used. The protective covering is preferably produced as a single sheet of polymer material that is then conformed to the desired specifications depending on the particular application for which the covering is to be used.

In a preferred embodiment of the invention, the dimensions of the protective covering are such that the protective covering is adapted for use with LCDs typically found in a restaurant kitchen environment. The device includes a sheet-like front portion, which rests directly over the surface of the LCD display when in use, a top portion that extends backwards from the sheet-like front portion, and a back portion that extends downward from the top portion such that the protective covering can be secured in place over the LCD monitor. When in position, the top portion of the protective covering preferably protects the display vents against foreign objects (such as grease and food in a restaurant environment) falling therein, but still allows heat to flow from the display into the ambient air. In a preferred embodiment a pair of angled tabs extends inward from the back portion at either end of the back portion to prevent sideways movement of the device along the width of the LCD.

In a preferred embodiment the protective covering device is manufactured from 60 mil polycarbonate material (such as Lexan, or PETG). Although the device of a preferred embodiment is preferably constructed from polycarbonate, it is contemplated that any suitable material may be used. The polymer or other material used to produce the present protective covering is preferably non-glossy and scratch resistant. Further, one preferred material is resistant to high temperatures (temperatures of up to 200° F. or more) so that the protective covering can be cleaned in a dishwasher of the type typically found in a restaurant, in which high levels of heat are used. In one embodiment, the device of the instant invention is made of Lexan, which is a material that has suitable characteristics for high temperature applications (such as restaurant applications). In applications in which the protective covering is unlikely to be exposed to high temperatures, such as in school applications, materials may be utilized that do not have as high temperature resistant capabilities, but which have increased durability. In one embodiment, the device of the instant invention is made of PETG, which is harder and more durable (e.g. increased scratch resistance) than Lexan, but which does not have the high temperature resistance of Lexan. Although the thickness of the device of a preferred embodiment is 60 mil, it is contemplated that any suitable thickness may be provided and that the desired thickness may vary depending on the particular use of the protective covering.

When properly positioned, the front sheet-like portion of the protective covering of the instant invention fits directly over the surface of the border (or frame) that surrounds the glass screen of a LCD. The thickness of the bezel between the border and the glass of the LCD creates an inset or gap between the front sheet-like portion of the protective covering and the glass of the LCD. This gap allows the sheet-like portion of the protective covering to bend inward toward the LCD glass when impacted, often absorbing the impact without making any contact with the glass of the LCD. The protective covering provides protection against puncturing of the glass screen of the LCD, such as by a knife or other instrument that may be used to point at the LCD screen and inadvertently come into contact therewith. The protective sheet further provides a mechanism for keeping the surface of the LCD clean so that the number of times the LCD must be subjected to wiping or cleaning with chemical cleaners is minimized. When the protective covering itself becomes dirty, the temperature-resistant polymer of one preferred embodiment allows the protective covering to be washed in a dishwasher, such as one found in a restaurant, and then placed in position once more over the more fragile LCD. Because of the need to keep the LCD clean, the present device fits onto an LCD in such a manner that there is preferably little airflow between the device and the front of the LCD.

In one embodiment of the invention, the front sheet-like portion of the protective covering is sized to extend over and cover the control buttons located on the front of the LCD (usually located within the border that surrounds the LCD glass). This is particular useful in restaurant applications in which the LCD is typically never turned off and in which it is desirable to protect the LCD from grease and/or food and beverage spills. In other applications in which the LCD is less likely to be exposed to grease and food/beverage spills, the front sheet-like portion of the protective covering is sized and/or shaped to leave the control buttons exposed. In one embodiment this is accomplished by shortening the height of the front sheet-like portion of the covering so that it does not extend over the control buttons which are typically located at the bottom of the frame of the LCD, but still extends over a portion of the bottom of the frame, when the covering is in position on the LCD. Alternatively, cut-outs can be made in the covering to expose the controls.

It is contemplated that the present protective covering may be used in restaurant environments, home or school environments, home or school environments where children may damage an LCD, industrial environments where equipment and workers may damage an LCD, or in any other environment in which an LCD is used and sought to be protected against accidental damage to the glass or plastic surface thereof.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1A is a side elevation view of the protective covering of FIG. 1.

FIG. 1B is a top plan view of the protective covering of FIG. 1.

FIG. 3 is a rear elevation view of a protective covering of a second embodiment of the instant invention.

FIG. 3A is a side elevation view of the protective covering of FIG. 3.

FIG. 4 is a rear elevation view of a protective covering of a third embodiment of the instant invention.

FIG. 4A is a top plan view of the protective covering of FIG. 4.

FIG. 5 is a rear elevation view of a protective covering of a fourth embodiment of the instant invention positioned on a LCD display.

FIG. 5A is a side elevation view of the protective covering of FIG. 5.

DETAILED DESCRIPTION OF PREFERRED EMBODIMENTS

As required, detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
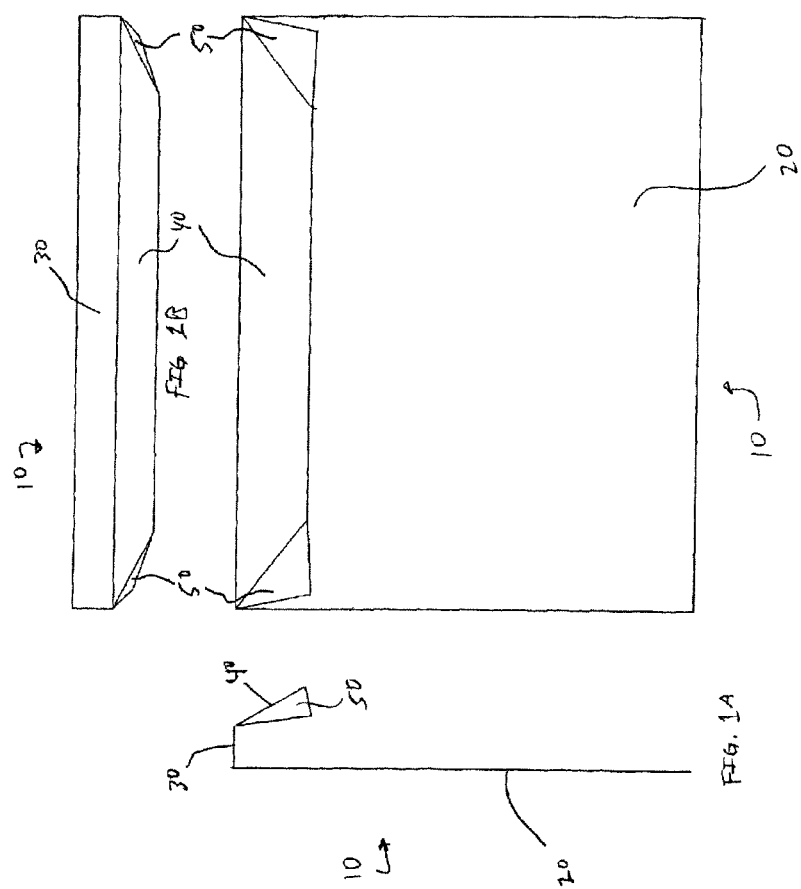
FIG. 1 is a rear elevation view a protective covering of a first embodiment of the present invention.
Figure 2:
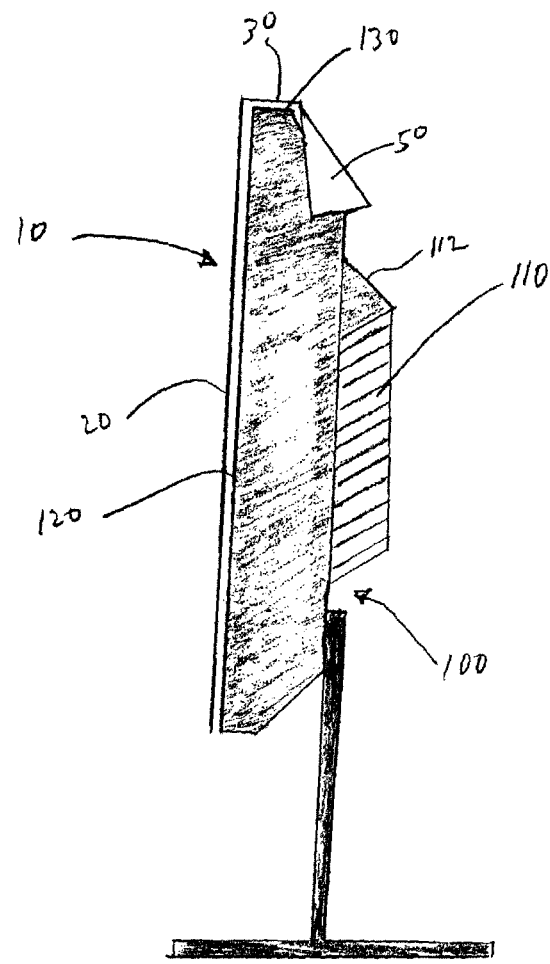
FIG. 2 is a side elevation view of the protective covering of FIG. 1 positioned on a LCD display.

Referring to FIGS. 1 through 2, a first embodiment of a protective covering of the instant invention is shown and described. Protective covering 10 includes sheet-like front portion 20, which rests directly over the surface of the border/frame of LCD display when in use (shown in FIG. 2), top portion 30 that extends backwards from sheet-like front portion 20, back portion 40 that extends downward from top portion 30, and tab portions 50 that extend inward from each end of top portion 30.

It will be appreciated that various sizes, shapes, orientations, arrangements and combinations of front portion 20, top portion 30, back portion 40 and tab portions 50, can be utilized without departing from the spirit and scope of the instant invention. In one preferred embodiment, the dimensions of protective covering are such that the protective covering is adapted for use with LCDs typically found in a restaurant kitchen environment. Referring to FIGS. 1 through 2, in one such preferred embodiment, which is particular useful for 17 inch Dell LCD's (and also for some 15 inch LCD's with relatively large borders/frames), front portion 20 is 14.5 inches wide (from right to left shown in FIG. 1) and 11.25 inches tall. Top portion 30 extends generally orthogonally from front portion 20 and is approximately 1 inch long. Back portion 40 angles downward from top portion 30 at an angle of approximately 60 degrees and is approximately 2 inches long. Each tab portions 50 is made by bending each end of back portion 40 inward at an angle of approximately 25 degrees along a line extending from the point along the outer end of back portion 40 in which back portion 40 meets top portion 30 to a point 1.9 inches inward from the outer end of bottom edge of back portion 40.

As is shown in FIG. 2, when properly positioned, front sheet-like portion 20 of protective covering 10 fits over front surface 120 of LCD 100 while top portion 30 rests on top of the top (30) of LCD 100. Tabs 50 prevent cover 10 from sliding sideways or off of either end of LCD 100. Protective covering 10 provides protection against puncturing, such as by a knife or other instrument that may be used to point at LCD 100 and inadvertently come into contact therewith. The protective sheet, 20, further provides a mechanism for keeping surface 120 of LCD 100 clean so that the number of times the LCD must be subjected to wiping or cleaning with chemical cleaners is minimized. When protective covering 10 itself becomes dirty, the temperature-resistant polymer (such as Lexan) used in one preferred embodiment allows protective covering 10 to be washed in a dishwasher, such as one found in a restaurant, and then placed in position once more over the more fragile LCD. Because of the need to keep LCD 100 clean, the present device fits onto an LCD in such a manner that there is preferably little airflow between the device and the LCD. Nevertheless, as is shown in FIG. 2, back portion 40 extends beyond the back of LCD 100 to prevent foreign objects from falling into top vents 112, but still allows heat to flow from vents 112 and 110 of LCD 100 and into the ambient air.

It is contemplated that the protective covering of then instant invention may be used in restaurant environments, home or school environments where children may damage an LCD, industrial environments where equipment and workers may damage an LCD, or in any other environment in which an LCD is used and sought to be protected against accidental damage to the glass or plastic surface thereof.

Referring to FIGS. 3 and 3A, a second embodiment of the protective covering of the instant invention that is particularly useful for LCD's located at movie theatre snack counters and cash registers is shown and described. In such environments, small LCD screens are used to display purchase price information to customers and also to display advertisements to the customers. In such environments, it is often desirable to have a protective covering that is less likely to be inadvertently removed by customers that may touch or brush against the LCD. As shown in FIGS. 3 and 3A, protective covering 10 of the second embodiment is made in much the same way as the protective covering described above and shown in FIGS. 1-2, the primary difference being the inclusion of bottom portion 35 that is identical and directly opposed to top portion 30. Bottom portion 35 includes back portion 40 and tab portions 50 that are identical mirror images to the back and tab portions extending from top portion 30. In use, protective covering 10 is positioned on a LCD by sliding covering 10 on the LCD from the side. Back portions 40 and tab portions 50 flex outward to allow tab portions 50 to slide around the LCD and then snap around the edge of the LCD when in the final position.

Referring to FIGS. 4 and 4A, a third embodiment of the protective covering of the instant invention is shown. Protective covering 10 of the third embodiment is made in much the same way as the protective covering described above and shown in FIGS. 1-2, the primary difference being the inclusion of notch 45 located in back portion 40. Notch 45 allows for additional airflow to vents located toward the top of the LCD (such as vents 112 shown in FIG. 2). This embodiment is particularly useful in applications in which grease and food/beverage spills are not a primary concern, or in applications in which additional venting is desired.

Referring to FIGS. 5 and 5A, a fourth embodiment of the protective covering of the instant invention is shown. Protective covering 510 includes sheet-like front portion 520, which rests directly over the surface of the border/frame of LCD display 100 when in use, top portion 530 that extends backwards from sheet-like front portion 520, and back spring-clip portions 540 that extends downward from top portion 530. Back spring-clip portions 540 flex outward as protective covering 510 is slid downward from the top of LCD 100 and into position and thereby clamp around the border/frame of LCD 100 to hold covering 510 in position. Back spring-clip portions 540 are spaced apart from each other and located towards the outer side edges of protective covering 510 to provide clearance around vents 110/112 which protrude from the back of LCD 100.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A protective covering for an liquid crystal display comprising:
   a sheet-like front portion that in a single plane extends over the glass of the liquid crystal display and rests directly over the surface of the frame that surrounds the glass of the liquid crystal display;

a top portion that extends backwards from the said front portion;

a back portion that extends downward from said top portion; and a pair of angled tabs that extend inward from either end of said back portion;

wherein said front portion, top portion and back portion are formed from a single piece of material.

2. A protective covering for an liquid crystal display comprising:

a sheet-like front portion that in a single plane extends over the glass of the liquid crystal display and rests directly over the surface of the frame that surrounds the glass of the liquid crystal display;

a top portion that extends backwards from said front portion;

a back portion that extends downward from said top portion;

a bottom portion opposed to said top portion, said bottom portion extending backwards from said front portion; and a back portion that extends upward from said bottom portion;

wherein said front portion, top portion and back portion are formed from a single piece of material.

3. A protective covering for an liquid crystal display comprising:

a sheet-like front portion that extends over the glass of the liquid crystal display and rests directly over the surface of the frame that surrounds the glass of the liquid crystal display;

a top portion that extends backwards from said front portion;

a back portion that extends downward from said top portion; and a pair of angled tabs that extend inward from either end of said back portion;

wherein said front portion, top portion and back portion are formed from a single piece of material.

4. A protective covering for an liquid crystal display comprising:

a sheet-like front portion that in a single plane extends over the glass of the liquid crystal display and rests directly over the surface of the frame that surrounds the glass of the liquid crystal display;

a top portion that extends backwards from said front portion; and a back portion that extends downward from said top portion;

wherein said front portion, top portion and back portion are formed from a single piece of material; and wherein said front portion defines an area that is larger than an area defined by said back portion.

5. The protective covering as claimed in claim 4 wherein said covering is manufactured of a polycarbonate material.

6. The protective covering as claimed in claim 5 wherein said material is a polycarbonate resin sheet material.

7. The protective covering as claimed in claim 4 wherein said covering is manufactured of a non-glossy material.

8. The protective covering as claimed in claim 4 wherein said covering is manufactured of a high temperature material.

9. The protective covering as claimed in claim 8 wherein said covering is manufactured of a polycarbonate material.

10. The protective covering as claimed in claim 9 wherein said material is a polycarbonate resin sheet material.

11. The protective covering as claimed in claim 8 wherein said material is resistant to temperatures of at least 200 degrees Fahrenheit.

12. The protective covering as claimed in claim 4 wherein said covering is manufactured of a scratch-resistant material.

13. The protective covering as claimed in claim 4 further comprising a notch located in said back portion.

14. The protective covering as claimed in claim 4 wherein said back portion comprises a spring-clip.

15. The protective covering as claimed in claim 14 wherein said spring-clip comprises a pair of spring-clips.

16. The protective covering as claimed in claim 4 wherein said top portion extends generally orthogonally from said front portion.

17. The protective covering as claimed in claim 16 where said back portion angles downward from said top portion at an angle of approximately 60 degrees.

18. The protective covering as claimed in claim 17 further comprising a pair of angled tabs that extend inward from either end of said back portion, and wherein each of said tabs angles inward at an angle of approximately 25 degrees from said back portion.

19. The protective covering as claimed in claim 4 wherein said back portion is displaced from said front portion such that a side of the LCD display is not covered by the protective covering when the protective covering is positioned on the LCD display.

20. A protective covering for an liquid crystal display comprising;

a sheet-like portion that extends over the glass of the liquid crystal display and rests directly over the surface of the frame that surrounds the glass of the liquid crystal display;

a top portion that extends backwards from said front portion; and a back portion that extends downward from said top portion;

wherein said front portion, top portion and back portion are formed from a single piece of material;

wherein said back portion defines a notch; and wherein said front portion defines an area that is larger than an area defined by said back portion.

21. The protective covering as claimed in claim 20 wherein said back portion is displaced from said front portion such that a side of the LCD display is not covered by the protective covering when the protective covering is positioned on the LCD display.

* * * * *